(12) United States Patent
Chougle et al.

(10) Patent No.: US 9,400,883 B2
(45) Date of Patent: Jul. 26, 2016

(54) AUTHENTICATION MECHANISM

(71) Applicant: INTERNATIONAL BUSINESS MACHINES CORPORATION, Armonk, NY (US)

(72) Inventors: Abdullah Q. Chougle, Pune (IN); Vishal V. Chougule, Pune (IN); Priyanka P. Jain, Indore (IN); Vivek Jain, Pune (IN)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 14/488,364

(22) Filed: Sep. 17, 2014

(65) Prior Publication Data

US 2016/0080356 A1 Mar. 17, 2016

(51) Int. Cl.
*H04L 29/06* (2006.01)
*G06F 21/45* (2013.01)
*G06F 21/60* (2013.01)

(52) U.S. Cl.
CPC ............. *G06F 21/45* (2013.01); *G06F 21/60* (2013.01); *H04L 63/083* (2013.01); *H04L 63/0876* (2013.01); *H04L 63/123* (2013.01)

(58) Field of Classification Search
CPC .......................... H04L 63/083; H04L 63/0876
USPC .......................................................... 726/5
See application file for complete search history.

(56) References Cited

U.S. PATENT DOCUMENTS

| | | | |
|---|---|---|---|
| 8,392,992 | B1 | 3/2013 | Spertus |
| 2010/0023888 | A1 | 1/2010 | Song |
| 2011/0296531 | A1 | 12/2011 | Toomey |
| 2012/0304302 | A1* | 11/2012 | Stecher ............. G06F 21/84 726/26 |
| 2016/0078216 | A1 | 3/2016 | Chougle et al. |

OTHER PUBLICATIONS

IBM. "Method and mechanism for preventing information leakage: password input field detection and protection". Original Publication Date: Dec. 25, 2008. IP.com No. IPCOM000177685D.
IBM. "Method for delaying transfer of focus to a new window". Original Publication Date: Jan. 14, 2009. IP.com No. IPCOM000178037D.
IBM. "Method for Preventing Password Field From Losing Focus". Orginal Publication Date: May 4, 2009. IP.com No. IPCOM000182606D.
"Ubuntu brainstorm—Prevent accidental typing of password to username field". Oct. 15, 2008. <https://web.archive.org/web/20081015133231/http:/brainstorm.ubuntu.com/idea/6552/>.
Appendix P—List of IBM Patents or Patent Applications Treated As Related.
U.S. Appl. No. 14/488,364, filed Sep. 17, 2014.
U.S. Appl. No. 14/736,334, filed Jun. 11, 2015.

* cited by examiner

*Primary Examiner* — Longbit Chai
(74) *Attorney, Agent, or Firm* — Brian M. Restauro; John Hayes (57) ABSTRACT

A computer-implemented method for preventing password leakage into a non-password field includes detecting that a user of an electronic device has entered a character in a non-password field appearing on a display associated with the electronic device. The character is echoed to at least the display, and stored to provide a stored character string. The stored character string is compared to a set of valid entries for the non-password field, when length of the stored character string reaches a predetermined threshold value. An alert is transmitted when the stored character string fails to match at least a substring of an element of the set of valid entries for the non-password field.

12 Claims, 6 Drawing Sheets

AUTHENTICATION MECHANISM

FIELD OF THE INVENTION

The present invention relates generally to preventing unauthorized access to computer-based resources and in particular to minimizing the opportunity for password theft through prevention of password leakage into non-password fields.

BACKGROUND OF THE INVENTION

In order to control access to computer-based resources, identification and authentication steps are often undertaken to help ensure that a particular access is appropriate. These steps are often embodied in a login name and password paradigm. A potential user is generally required to provide a legitimate login name in a dedicated login name field, followed by the entry of a password associated with the user and known to the resource being accessed. Of course, the resource being accessed may simply be the user's own computing device, with login restrictions applied to forestall unauthorized use.

The login name and password entry process is perhaps even more desirable in controlling remote access to resources. Because of the ubiquitous nature of Internet access, employees often find themselves working from remote locations where access to corporate, network-based resources is essential to productivity. Connection to an enterprise network is often obtained using a VPN, or Virtual Private Network, over which communications may be encrypted to enhance security. Naturally, in a VPN setting, or in using any of a number of remote access implementations, identification and authentication of the potential user is desirable in order to maintain the security of remote access.

Since a user attempting remote access may be in a public place, such as an airport, a coffee shop, a public library, etc., consideration should be given to the threat of theft of login credentials by stealth. Many logon screens currently implement a protective mode in which the user's login name is replaced by non-alphanumeric characters (such as asterisks, for example), immediately after the user types his user name and exits the login name field. Further protection is often extended to the password field, where characters entered by the user are not displayed at all, but are instead replaced by a non-alphanumeric character at the time of character entry. For additional protection in the password field, an arbitrary or random number of non-alphanumeric characters are sometimes displayed in response to any character entered by the user, in order to help conceal the actual password length from an unwanted observer. Of course, if a user should inadvertently attempt to enter a password in a non-password field, the precautions noted above may not be available as an aid in safeguarding password security.

SUMMARY

Embodiments in accordance with the present invention disclose a method, computer program product, and system for preventing password leakage into a non-password field. A computer-implemented method includes detecting that a user of an electronic device has entered a character in a non-password field appearing on a display associated with the electronic device. The character is echoed to at least the display, and stored to provide a stored character string. The stored character string is compared to a set of valid entries for the non-password field, when length of the stored character string reaches a predetermined threshold value. An alert is transmitted when the stored character string fails to match at least a substring of an element of the set of valid entries for the non-password field.

DETAILED DESCRIPTION

Desired aspects in the prevention of password leakage into non-password fields include detection of an improper field, and notification of the user, in order to prevent an unauthorized person from viewing the user's password in the clear. In a common scenario during a simple logon procedure, a user may type his User Name into the proper field, but inadvertently fail to place the cursor in the Password field before typing in his password.

This action threatens to expose at least the initial characters of the user's password. In an aspect in accordance with the present invention, a warning is provided to a user who appears to be typing his password into a non-password field. Typing of a password into a User Name field is readily detectable on a logon screen, since the system (a laptop or desktop computer, for example) to which the user is attempting to gain access is well aware of existing valid user names. It is also possible to detect inadvertent password entry in other situations by implementing additional field testing. In situations where a web page is involved in identification and authentication steps, a database on a server computer can aid in forestalling improper password entry.

Figure 1:
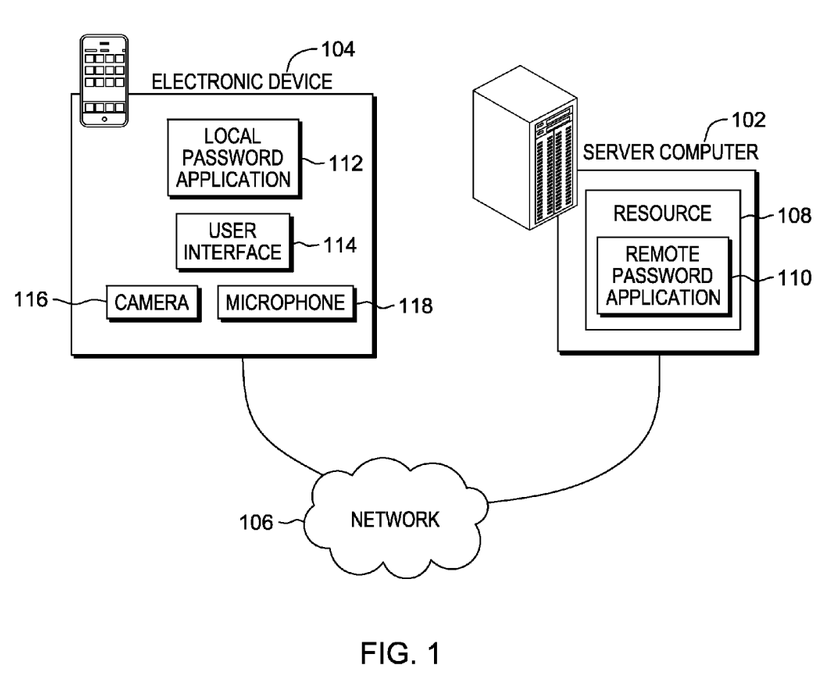
FIG. 1 is a functional block diagram illustrating a distributed data processing environment, in an embodiment in accordance with the present invention.

Example embodiments in accordance with the present invention will now be described in detail with reference to the drawing figures. FIG. 1 is a functional block diagram illustrating a distributed data processing environment, in an embodiment in accordance with the present invention. The distributed data processing environment includes server computer 102 and electronic device 104 interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine readable program instructions and communicating with other computer devices via a network. In this embodiment, server computer 102 has the ability to communicate with other computer devices to query the computer devices for information.

In one embodiment, resource 108 residing in server computer 102 includes remote password application 110. In another embodiment, resource 108 does not include remote password application 110, but, in any configuration, resource 108 can communicate with remote password application 110. Examples of resource 108 can include a website, a database, or any remotely accessible medium which can request credential verification of a user. Remote password application 110 may handle the verification of credentials of the user for resource 108.

In some embodiments, remote password application 110 may receive a user name and password for verification from the user of electronic device 104. In other embodiments, local password application 112, located on electronic device 104, may provide a medium between the user of electronic device 104 and remote password application 110. Local password application 112 may receive input information through various components of electronic device 104 such as, for example, without limitation, user interface 114, camera 116, and microphone 118. The user of electronic device 104 may utilize user interface 114 for user ID and password entry via a keyboard, for example, while camera 116 and microphone 118 may be utilized, in some embodiments, to gather additional information about the user of electronic device 104 and the environment in which electronic device 104 is operating.

In general, network 106 can be any combination of connections and protocols that can support communications between server computer 102 and electronic device 104. Network 106 can include, for example, a local area network (LAN), a wide area network (WAN), such as the internet, a cellular network, or any combination of the preceding, and can further include wired, wireless, and/or fiber optic connections.

In various embodiments of the present invention, electronic device 104 can be a laptop computer, a tablet computer, a netbook computer, a personal computer (PC), an automated teller machine (ATM), a medical device, a personal digital assistant (PDA), a smartphone, or any programmable electronic device capable of at least receiving inputs and communicating with server computer 102 via network 106.

User interface (UI) 114 on electronic device 104 displays information that any one of the processes of remote password application 110 or local password application 112 may display to a user. User interface 114 can be, for example, a graphical user interface (GUI) or a web user interface (WUI) that displays text, documents, web browser windows, user options, application interfaces and instructions for operation. User interface 114 also has the ability to receive user inputs for remote password application 110 as well as local password application 112.

Figure 2:
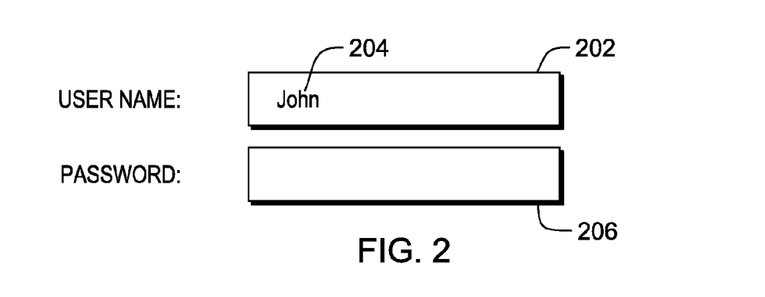
FIG. 2 depicts a portion of a logon screen in an embodiment in accordance with the present invention.

FIG. 2 depicts a portion of a logon screen in an embodiment in accordance with the present invention. As can be appreciated from an examination of FIG. 2, a user has just entered his user name "John" 204 in the user name field 202. Normally, the user would then position the cursor in the password field 206, perhaps by using the TAB key on his keyboard, or by positioning the cursor in the password field 206 through manual cursor movement, then using appropriate cursor control actions (left-clicking or tapping, for example) to make the password field 206 the active field.

Figure 3:
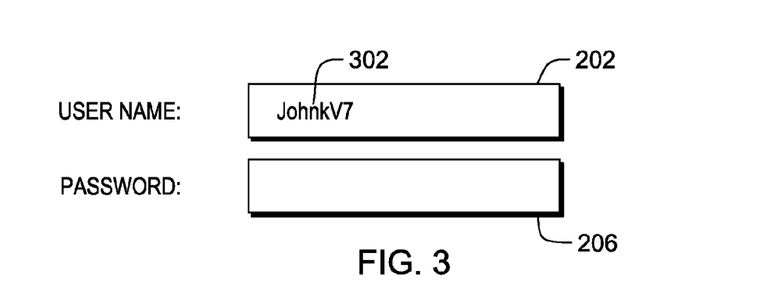
FIG. 3 presents another view of a portion of a logon screen in an embodiment in accordance with the present invention.

FIG. 3 presents another view of a portion of a logon screen in an embodiment in accordance with the present invention. As shown in FIG. 3, the user has continued to type the characters "kV7" in the user name field 202 after typing his user name "John" 204, resulting in the character string "Johnkv7" 302. This may indicate a situation in which the user has begun to type his password into the user name field 202. This is a cause for concern, since characters typed into any field other than the password field 206 are generally visible to anyone who may be looking over the user's shoulder.

Figure 5:
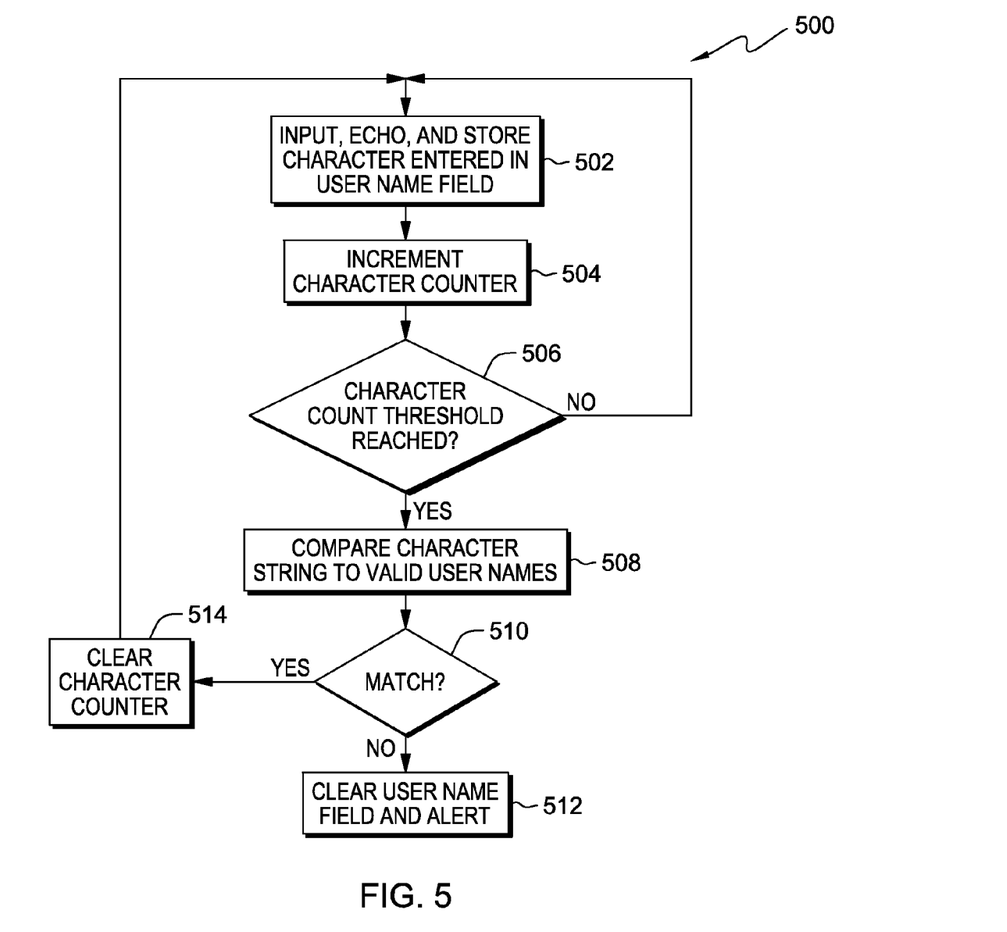
FIG. 5 is a flowchart illustrating operational steps of a method that helps to forestall password leakage in an embodiment in accordance with the present invention.

FIG. 5 is a flowchart, generally depicted by the numeral 500, illustrating operational steps of a method that helps to forestall password leakage in an embodiment in accordance with the present invention. In a situation where a user is attempting to enter his user name and password in a logon screen for his device, in step 502 local password application 112 inputs, echoes, and stores a character entered in user name field 202. In general, when an input process "echoes" a character, the process may transmit the character to a display device, and perhaps to other destinations as well. Since local password application 112 has access to valid user names for the user's device, local password application 112 prepares to compare character strings entered into user name field 202 to ensure that it is a user name, and not a password, that is being entered.

In order to accomplish this, a character count threshold is determined and set within local password application 112. In situations where there are many users, each having a different user name, who are authorized to access a particular electronic device, it may be appropriate to set the character count threshold at 5, for example. For a device with a relatively small number of authorized users, a smaller number, such as 3, may be more effective. In any event, it is possible to determine an optimum character count threshold through empirical methods.

A character counter is initialized to zero during startup of local password application 112. After a character is input in step 502, the character counter is incremented in the next step (504). The character counter value is then tested in step 506 to determine whether the character count has reached the predetermined threshold value. If not (step 506, "no" branch), local password application 112 returns to step 502 to input another character. If the character count threshold has been reached (step 506, "yes" branch), the input character string is tested in step 508 to determine whether the string is a portion of a valid user name.

If the input character string matches a portion of a valid user name (step 510, "yes" branch), local password application 112 is satisfied that the user is, in fact, in the process of entering a valid user name. So the character counter is cleared in step 514, and local password application 112 returns to step 502 to input another character. In the event the input character string is not a match for a portion of a valid user name, (step 510, "no" branch), the user name field is cleared and an alert is generated in step 512.

The alert to the user generated in step 512 may take a number of forms. An audible alert, such as a series of beeps, may be generated. The display of electronic device 104 may be caused to "flash" through modulation of display intensity. In addition, an alert message, such as "Invalid User Name," may be presented on the display. Furthermore, since detection of a character string in the user name field that is not part of a valid user name may suggest that a portion of the user's password may have been compromised, another possible alert mechanism may include notification to the user, based upon properly entered user name characters in the user name field, the notification being transmitted by SMS (Short Message Service) message to a mobile phone number associated with the user name in a database accessible to local password application 112. The notification may also be provided by e-mail to an e-mail address associated with the user name. It is also possible that local password application 112 may lock the user out if password exposure is suspected, and display a message requiring the user to change his password.

Figure 7A:
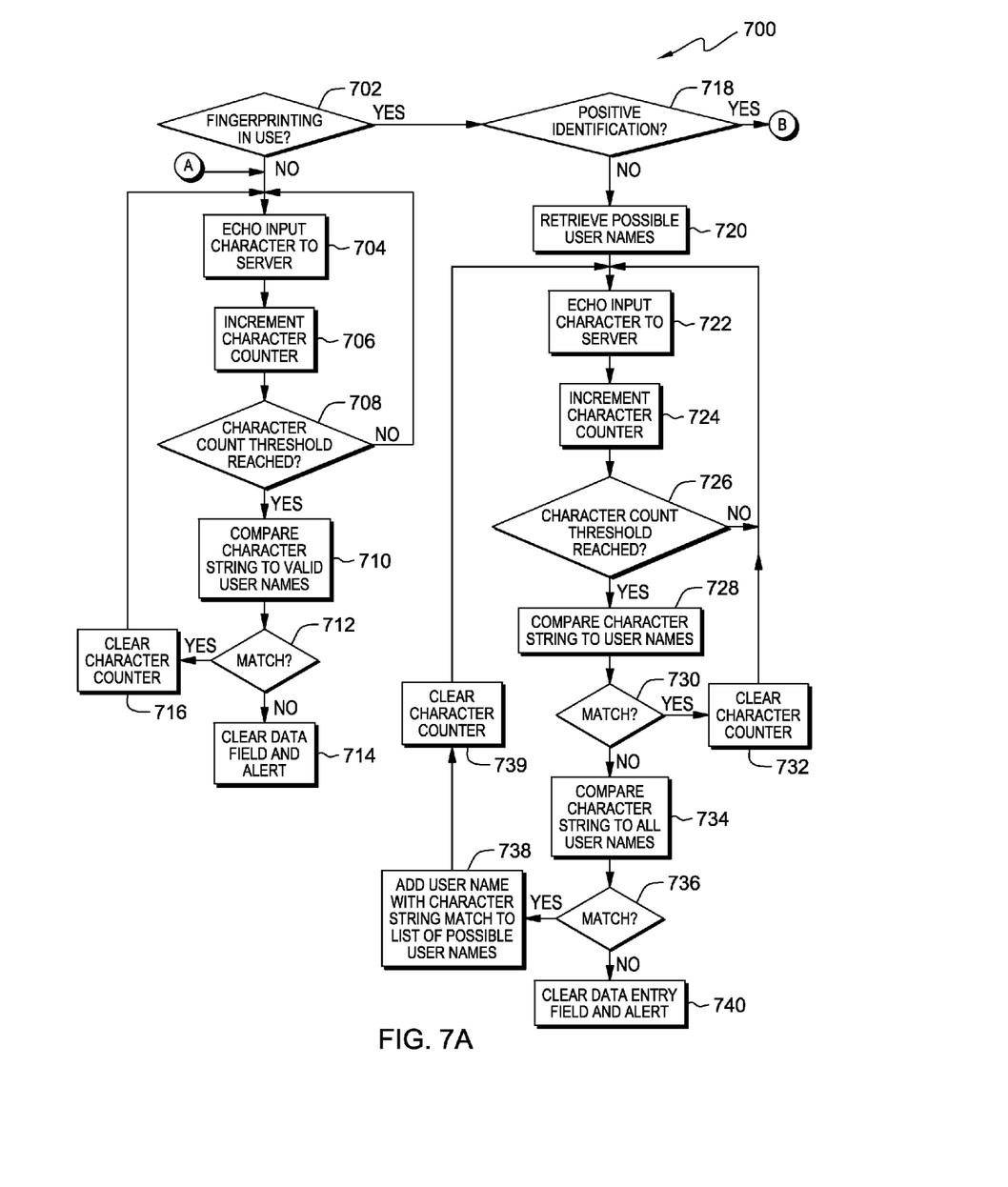
FIGS. 7A and 7B combine to form a flowchart illustrating operational steps in an embodiment in accordance with the present invention, where a user attempts to identify and authenticate to access a resource on a remote device.
Figure 7B:
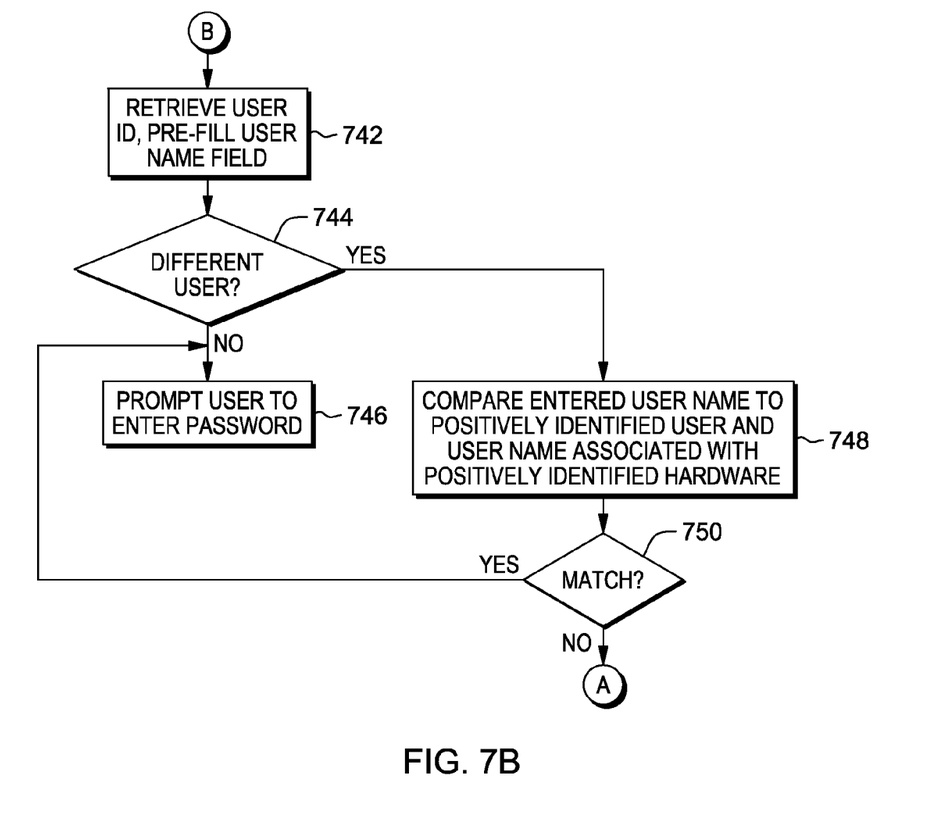

FIGS. 7A and 7B combine to form a flowchart, generally depicted by the numeral 700, illustrating operational steps in an embodiment in accordance with the present invention, where a user attempts to identify and authenticate to access a resource on a remote device. Such a context is illustrated in FIG. 1, where, in an example embodiment, a user of electronic device 104 wishes to access a resource 108 that is hosted by a server computer 102 accessible over a network, such as network 106.

In an example embodiment, resource 108, which may be, for example, a web page, transmits a logon page over network 106 to electronic device 104, which is rendered by a browser program resident on electronic device 104, so the logon page is visible to the user of electronic device 104 and available for suitable interaction. Once communication with the user is established, it is determined whether fingerprinting is in use in step 702 of FIG. 7A. Fingerprinting is a technique that may be utilized by remote password application 110 to attempt to identify electronic device 104 and/or the user of electronic device 104. In an embodiment, a "fingerprinting active" flag may be set, perhaps on both the server 102 and the user's electronic device 104, to provide notification that fingerprinting is in use. Of course, other varieties of global notification for fingerprinting activity may also be employed.

In one embodiment, active fingerprinting may be in use, for which user permission is generally needed. Information related to user hardware is generally collectable under active fingerprinting, and useful information such as the Media Access Control (MAC) address associated with the user's machine may be determined. Knowing the MAC address permits positive identification of the user's hardware. In an embodiment, local password application 112 may collect useful data related to the user's device, and forward this information to the remote password application 110 resident on server computer 102. Of course, other data collection techniques may be employed, for example, but not limited to, a scanning utility resident on a user's electronic device 104, or an applet pushed to the user's electronic device 104 from server computer 102.

Other fingerprinting implementations may also be used in various embodiments in accordance with the present invention. Browser fingerprinting may provide clues to the user's identity, as may a retrieval of the user's font list. Although this type of fingerprinting may not positively identify a user's machine, it may allow the list of possible user names to be reduced, thus improving efficiency in cases where positive identification is difficult. Both biometric identification and image processing may result in positive identification. If the user's electronic device is camera-equipped, it may be possible to positively identify the user's image through image-processing techniques. In cases where the user's machine is equipped with a microphone, the user's voice may be analyzed to arrive at a positive identification of the user, and it may even be possible to analyze background images and audio to extract some clues related to the user's hardware or location that may help narrow the list of possible user names as suggested above.

If fingerprinting is not is use (step 702, "no" branch), characters entered in the user name field of the logon page are displayed and echoed to the server computer 102 in step 704. In order to avoid any disruptive reloading of the logon page, background messaging may be used to transmit entered characters to the server. One such method that may be used in various embodiments in accordance with the present invention is AJAX (Asynchronous JavaScript and XML). Characters may also be transmitted to the server by local password application 112, or through a messaging capability provided through application integration middleware.

It should be noted that the user's electronic device 104 and server computer 102 may be connected via network 106 in what is known as a "client-server" relationship. The client-server model is a popular configuration for networked computing in which the remotely-located computer, or server, is designed to share software and data with a local client that simply needs to establish contact with the server to use its software and data resources. Much effort has been expended to overcome communication impediments that may interfere with proper, and perhaps seamless, communication between resources on a client computer and remote resources located on a server. Many of these difficulties can be resolved through "application integration middleware."

In simple terms, application integration middleware is computer software that resides between the operating system for a particular platform and application software providing desirable functionality. Middleware's primary purposes are facilitating communication and input/output (I/O) operations among applications. Since incompatibilities among disparate applications and data structures are regularly encountered both inside and outside the enterprise setting, even in client-server operations, enabling proper communication and I/O is a feature often found in application integration middleware. This communication feature may enable sophisticated messaging between resources that does not disrupt foreground operations.

A character counter is incremented in step 706 in order to help track the length of an entered character string. The character counter is cleared before first-time character entry begins. Clearing of the character counter may be initiated, for example, by transmission of the logon page to the user's electronic device 104. In step 708, the character counter is examined to determine whether the character count threshold has been reached. Character count threshold may be determined empirically using criteria similar to those discussed in conjunction with FIG. 5 above. One of the considerations in choosing a character count threshold is balancing the number of characters of a password that could potentially be revealed with the likelihood that false matches may occur between a valid user name and the character string entered by the user. In any event, character count threshold is a predetermined value to which the character counter value is compared.

In the event that the character count threshold has not yet been reached (step 708, "no" branch), input characters continue to be displayed and echoed to the server in step 704. If the character count threshold has been reached (step 708, "yes" branch), the input character string is compared to the entries in the list of valid user names (step 710). If the input character string matches at least a substring of a valid user name (step 712, "yes" branch), the character counter is cleared in step 716 and character input resumes in step 704. If there is no match of the input character string to any substring of a valid user name (step 712, "no" branch), the data entry field is cleared and an alert message is transmitted (step 714) to the user's electronic device 104. The alert message may trigger an audible alarm at the user's device, as well as attention mechanisms such as screen flashing and/or one or more warning messages displayed on the user's device. In addition, warning messages may be transmitted via SMS or e-mail to pre-configured recipients, much as described previously in conjunction with the embodiment illustrated in FIG. 5.

In a situation in which fingerprinting is in use (step 702, "yes" branch), but positive identification cannot be made (step 718, "no" branch), a subset of the list of all valid user names is retrieved in step 720 based upon information acquired from the user's electronic device 104. As noted previously, even when positive identification of user's hardware (or of the user himself) cannot be achieved through fingerprinting, the list of possible user names may be capable of refinement based upon clues detected during the fingerprinting process. This reduction in size of the list of user names that is considered for character string matches provides some additional efficiencies in the search process that would not otherwise be achievable.

Similar to the process in which characters are input when no fingerprinting is in use, characters entered in the user name field of the logon page are displayed and echoed to the server computer 102 in step 722 in much the same fashion as is described above for step 704. A character counter is incremented in step 724 in order to help track the length of an entered character string. The character counter is cleared before first-time character entry begins. Clearing of the character counter may be initiated, for example, by transmission of the logon page to the user's electronic device 104. In step 726, the character counter is examined to determine whether the character count threshold has been reached.

In the event that the character count threshold has not yet been reached (step 726, "no" branch), input characters continue to be displayed and echoed to the server in step 722. If the character count threshold has been reached (step 726, "yes" branch), the input character string is compared (step 728) to the entries in the reduced-size list of possible user names retrieved in step 720. If the input character string matches at least a substring of an element of the set of possible user names (step 730, "yes" branch), the character counter is cleared in step 732. The process of inputting a character and echoing the character to the server then resumes in step 722. If there is no match of the input character string to any substring of a user name from the list (step 730, "no" branch), the input character string is then compared to the entire list of valid user names in step 734. If there is a match (step 736, "yes" branch), the user name that matched the input character string is added to the reduced-size list of possible user names in step 738, the character counter is cleared (step 739), and the process of inputting a character and echoing the character to the server resumes in step 722. If there is no match (step 736, "no" branch) the data entry field is cleared and an alert message is transmitted (step 740) to the user's electronic device 104. The alert message may trigger an audible alarm at the user's device, as well as attention mechanisms such as screen flashing and/or one or more warning messages displayed on the user's device. The alert process closely follows the process described in conjunction with step 714 above.

Figure 6:
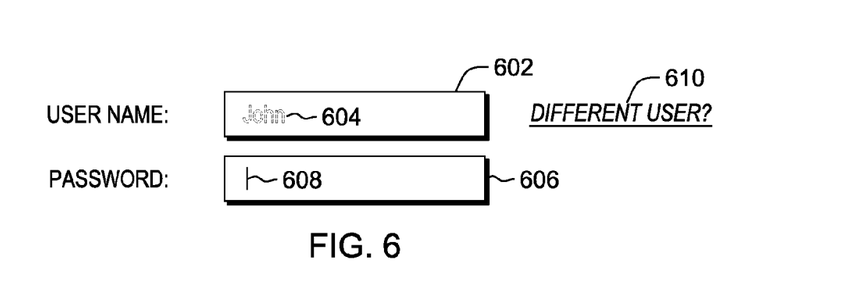
FIG. 6 depicts a portion of a logon page illustrating operation in an embodiment in accordance with the present invention.

In the event that fingerprinting successfully achieves a positive identification of the user or the user's hardware (step 718, "yes" branch), program flow shifts through exit point B of FIG. 7A to entry point B of FIG. 7B, where the user name field is pre-filled with the user name associated with the identified user (or user's hardware) in step 742. FIG. 6 depicts a portion of a logon page illustrating operation in an embodiment in accordance with the present invention. As shown in FIG. 6, the user name field 602 is no longer the active field, as indicated by the user name 604 being grayed out, and the cursor 608 being repositioned in the active password field 606. In accordance with other embodiments, the user name field 602 may be totally obscured, although it may be advantageous to display the user name in the clear for a brief period before obscuring the user name 604, since there may be more than one authorized user for a given electronic device 104, and it would give the user an opportunity to view the user name to ascertain whether the proper user name has been entered. It may also be a useful feature to re-display the user name if the user "clicks" (or taps, if that is appropriate, such as with a touch pad) with the cursor positioned over the obscured user name field.

If the user name is not correct, and a different user desires to log in, a "DIFFERENT USER?" hyperlink 610 is provided. If the user selects this hyperlink (step 744, "yes" branch), the different user is permitted to enter his user name in the user name field. The entered user name is compared to user names of the positively identified user, and to user names associated with authorized users of the positively identified hardware, in step 748. If a match is detected (step 750, "yes" branch), then the user name field is locked out (and perhaps grayed out, as suggested above), and the cursor 608 is positioned in the password field 606 so that the user may enter his password. In fact, a prompt may appear, requesting that the user enter his password in this situation, to remind the user that the cursor is now in the password field. The same result (step 746) occurs in a case where a different user is not selected (step 744, "no" branch).

On the other hand, if the user name entered by the "different user" does not match a user name of the positively identified user, nor match a user name of a user associated with the positively identified hardware (step 750, "no" branch), for security purposes, program flow shifts through exit point A of FIG. 7B to entry point A of FIG. 7A (step 704), the character counter is cleared, and the new user is compelled to follow the path set aside for situations where fingerprinting is not in use.

Figure 4:
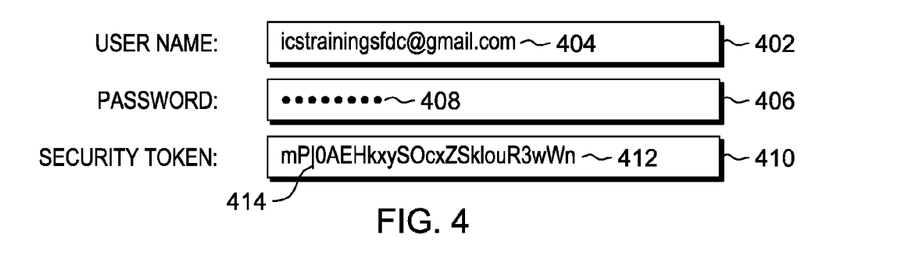
FIG. 4 depicts a portion of a logon page that includes a security token field, in an embodiment in accordance with the present invention.

FIG. 4 depicts a portion of a logon page that includes a security token field, in an embodiment in accordance with the present invention. It is possible that a user may accidentally type his password into a visible field on any type of web form, causing risk of password exposure. Often, as described above in various embodiments in accordance with the present invention, this field will be the user name field 402, but it could occur in various other fields as well, for example, a field 410 for entering a security token number 412. The position of cursor 414 in the security token field 410 indicates that the user may have begun typing a password in this field.

In situations where the user name 404 has been entered in the user name field 402, the password 408 has been entered in the password field 406, and the password 408 has already been verified (thus completing identification and authentication steps), characters entered into the security token field that are not part of the known security token, but are part of the user's password, can be detected and cleared, and a suitable warning provided to the user, using a technique very similar to various embodiments outlined above. The foregoing is an example of a system that has the capability to warn the user when characters are entered in fields in a form where some of the fields may be password fields, but the remaining fields are plain text. A warning may occur when a user enters characters that cannot possibly belong in a given text field, thus forestalling a potential password leak. In an embodiment, a warning may occur when the user enters characters in a text field that do not belong to that field, and the characters do belong to the user's password, preventing a potential password leak.

In an illustrative embodiment, a user enters his user name, which will be subject to one of the implementations discussed above, which provides an alert when characters that do not belong to any valid user name are entered. Once the user name is completely entered, the user's password may be retrieved from a password repository. Password retrieval may be supported through a repository API (Application Program Interface) that accepts a user name and returns the user's password. The user enters his user name correctly, but then presses TAB accidentally twice, sending focus onto the Security Token field 410.

When the user starts typing his password into Security Token field 410, it is determined that a valid user name 404 is present in the user name field 402 already. This can be accomplished by setting a flag for the session when user name validation is successfully completed. Then the system may continue checking, through a series of messages (AJAX requests, for example), whether the entered characters are part of the user's password and not part of the security token itself. Once the number of characters entered reaches a character count threshold, the user is alerted through a warning mechanism.

As noted above in conjunction with the FIG. 7B description, when fingerprinting positively identifies a user or the user's hardware, the user name field may be pre-filled, locked out, and the cursor placed in the password field, perhaps with a prompt requesting that the user enter his password. In a situation where the user knows that fingerprinting is active and working properly, and the user attempts to access the logon for a remote resource and the user name field is not pre-filled, this is a strong indication that the remote site may be fake, since it suggests that the fingerprint cannot be properly detected. This may serve as a warning to the user about a potential phishing attack, as the genuine site would have the capability to detect the user's device, or the user himself, and pre-fill the user name field.

Figure 8:
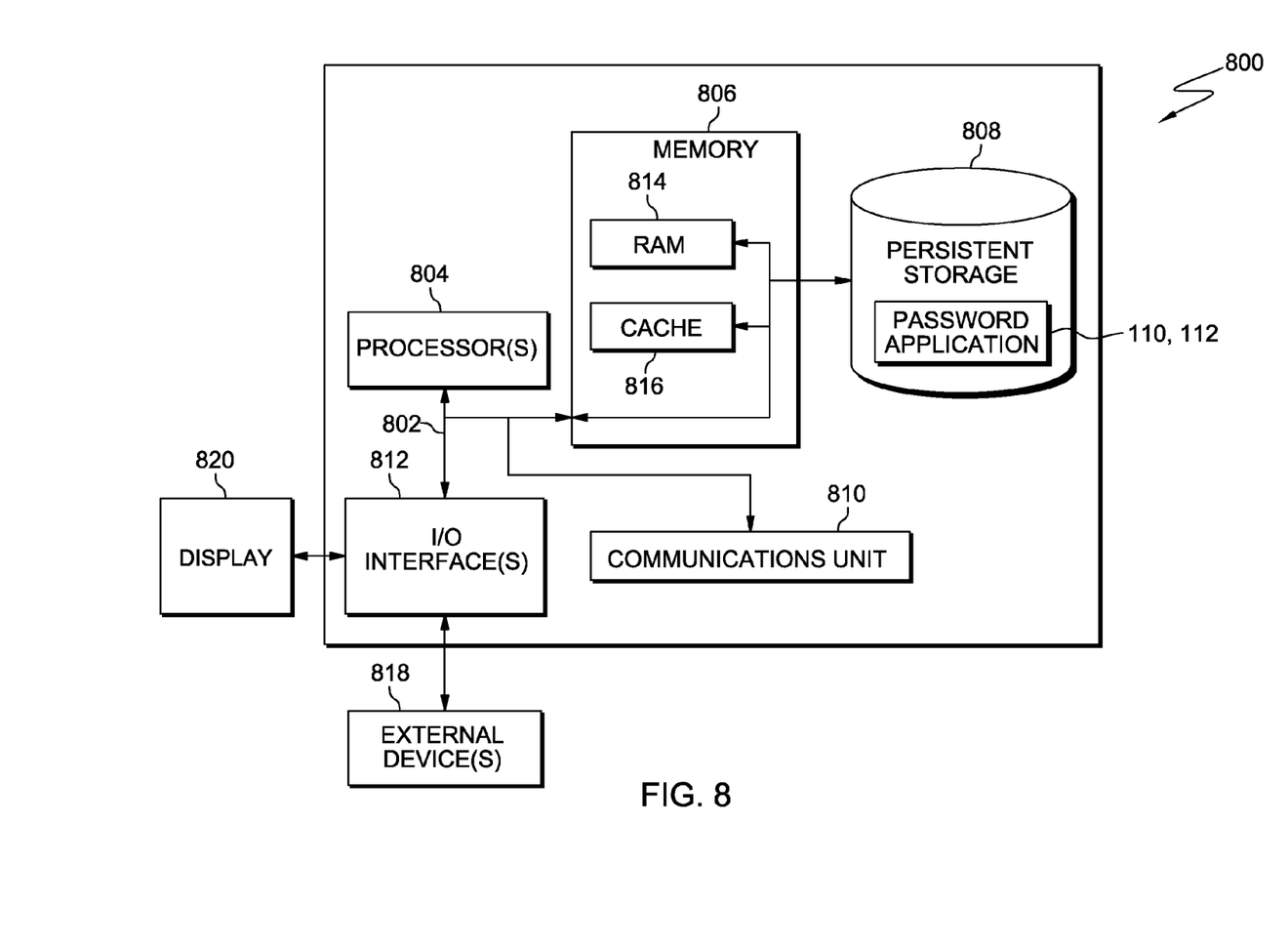
FIG. 8 is a functional block diagram of a computer system in an embodiment in accordance with the present invention.

FIG. 8 is a functional block diagram of a computer system, generally depicted by the numeral 800, in an embodiment in accordance with the present invention. Computer system 800 is representative of both electronic device 104, hosting local password application 112, and server computer 102, hosting resource 108 and remote password application 110, along with data structures and/or other resources in an illustrative embodiment in accordance with the present invention. It should be appreciated that FIG. 8 provides only an illustration of one implementation and does not imply any limitations with regard to the environments in which different embodiments may be implemented. Many modifications to the depicted environment may be made.

Electronic device 104 and server computer 102 may include communications fabric 802, which provides communications between computer processor(s) 804, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses.

Memory 806 and persistent storage 808 are examples of computer readable tangible storage devices. A storage device is any piece of hardware that is capable of storing information, such as data, program code in functional form, and/or other suitable information on a temporary basis and/or permanent basis. In this embodiment, memory 806 includes random access memory (RAM) 814 and cache memory 816. In general, memory 806 can include any suitable volatile or non-volatile computer readable storage device.

Password application 110 or 112 may be stored in persistent storage 808 for execution by one or more of computer processors 804 via one or more memories of memory 806. In this embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices, including systems and devices within or controlled by server computer 102. In these examples, communications unit 810 includes one or more wireless network interface cards. Communications unit 810 may provide communications through the use of either or both physical and wireless communications links. Computer programs and processes, such as password application 110 or 112, may be downloaded to persistent storage 808 through communications unit 810, or uploaded to another system through communications unit 810.

I/O interface(s) 812 allows for input and output of data with other devices that may be connected to electronic device 104 or server computer 102. For example, I/O interface 812 may provide a connection to external devices 818 such as a keyboard, keypad, a touch screen, and/or some other suitable input device, and may also provide a connection to camera 116 and microphone 118, as illustrated in FIG. 1. External devices 818 can also include portable computer readable storage media such as, for example, thumb drives, portable optical or magnetic disks, and memory cards. Software and data used to practice embodiments of the present invention can be stored on such portable computer readable storage media and can be loaded onto persistent storage 808 via I/O interface(s) 812. I/O interface(s) 812 may also connect to a display 820. Display 820 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for preventing password leakage into a user name field, the computer program product comprising:
   one or more computer readable tangible storage media and program instructions stored on at least one of the one or more storage media, the program instructions comprising:
      program instructions to detect that a user of an electronic device has entered at least a character of a set of characters in a user name field appearing on a display associated with the electronic device;
      program instructions to echo the one or more characters to at least the display of the user name field;
      program instructions to store the one or more characters to provide a stored character string of the user name field;
      program instructions to, responsive to detecting each respective character that has been entered in the user name field, increment and store a character count;
      program instructions to, responsive to the stored character string reaching a predetermined threshold value, compare the stored character string to a set of valid user name entries for the user name field; and program instructions to, responsive to determining that the stored character string fails to match a portion of any of the user name entries in the set of valid user name entries:

clear the display of the stored character string, lock out the user from the user name field until security has been re-established, transmit a first alert to the display associated with the electronic device, and transmit a second alert, wherein the second alert is transmitted to a mobile phone number associated with valid user names entries indicating a portion of a user password is at risk of being compromised.

2. The computer program product of claim 1, further comprising:

program instructions to determine whether sufficient information has been collected to permit identification of the user of the electronic device or the electronic device itself; and where positive identification of the user or the device cannot be established, program instructions to apply the collected information to reduce the set of valid user name entries to which the stored character string is compared.

3. The computer program product of claim 2, wherein program instructions to apply the collected information to reduce the set of valid user name entries to which the stored character string is compared further comprise:

program instructions to evaluate the collected information, and exclude elements of the set of valid entries that are not associated with sufficient characteristics related to the collected information.

4. The computer program product of claim 1, wherein program instructions to detect that a user of an electronic device has entered a character in a username field appearing on a display associated with the electronic device further comprise:

program instructions to render content provided to the electronic device by a server;

program instructions to determine that a character has been entered in an active field within the rendered content; and program instructions to determine that the active field is a user name field.

5. The computer program product of claim 1, wherein program instructions to echo the character to at least the display further comprise:

program instructions to echo the character to a server, by utilizing background messaging.

6. The computer program product of claim 1, wherein program instructions to transmit first alert, when the stored character string fails to match at least a substring of an element of the set of valid entries for the user name field further comprise:

program instructions to transmit an alert that includes one or more of an audible alert, a visual alert, and an alert message transmitted to a designated recipient.

7. A computer system for preventing password leakage into a user name field, the computer system comprising:

one or more computer hardware processors; and one or more computer readable storage media storing program instructions that when executed by the hardware processors cause the hardware processors to;

detect that a user of an electronic device has entered at least a character of a set of characters in a user name field appearing on a display associated with the electronic device;

echo the one or more characters to at least the display of the user name field;

store the one or more characters to provide a stored character string of the user name field;

responsive to detecting each respective character that has been entered in the user name field, increment and store a character count;

responsive to the stored character string reaching a predetermined threshold value, compare the stored character string to a set of valid user name entries for the user name field; and responsive to determining that the stored character string fails to match a portion of any of the user name entries in the set of valid user name entries:

clear the display of the stored character string, lock out the user from the user name field until security has been re-established, transmit a first alert to the display associated with the electronic device, and transmit a second alert, wherein the second alert is transmitted to a mobile phone number associated with valid user names entries indicating a portion of a user password is at risk of being compromised.

8. The computer system of claim 7, wherein the program instructions stored on the one or more computer readable storage media further comprise program instructions that when executed by the hardware processors cause the hardware processors to:

determine whether sufficient information has been collected to permit identification of the user of the electronic device or the electronic device itself; and where positive identification of the user or the device cannot be established, program instructions to apply the collected information to reduce the set of valid user name entries to which the stored character string is compared.

9. The computer system of claim 8, wherein the program instructions to apply the collected information to reduce the set of valid entries to which the stored character string is compared further comprise program instructions that when executed by the hardware processors cause the hardware processors to:

evaluate the collected information, and exclude elements of the set of valid entries that are not associated with sufficient characteristics related to the collected information.

10. The computer system of claim 7, wherein the program instructions to detect that a user of an electronic device has entered a character in a non-password field appearing on a display associated with the electronic device further comprise program instructions that when executed by the hardware processors cause the hardware processors to:

render content provided to the electronic device by a server;

determine that a character has been entered in an active field within the rendered content; and determine that the active field is a user name field.

11. The computer system of claim 7, wherein the program instructions to echo the character to at least the display further comprise program instructions that when executed by the hardware processors cause the hardware processors to:

to echo the character to a server, by utilizing background messaging.

12. The computer system of claim 7, wherein the program instructions to transmit a first alert, when the stored character string fails to match at least a substring of an element of the set of valid entries for the user name field further comprise program instructions that when executed by the hardware processors cause the hardware processors to:
  transmit an alert that includes one or more of an audible alert, a visual alert, and an alert message transmitted to a designated recipient.

\* \* \* \* \*